Figure 1:
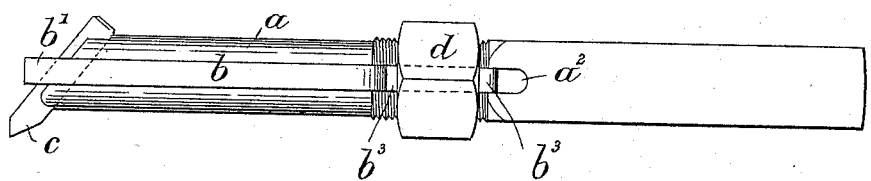

(No Model.)

W. H. HARDY.
TOOL AND HOLDER FOR USE IN CUTTING, BORING, AND SLOTTING METALS.

No. 605,422.  
Patented June 7, 1898.

Witnesses  
John Chatman Welch Jr.  
D. H. Blakelock

Inventor  
W. H. Hardy  
by Wilkinson & Fisher,  
Attorneys

UNITED STATES PATENT OFFICE.

WILLIAM HENRY HARDY, OF HARTLEPOOL, ENGLAND.

TOOL AND HOLDER FOR USE IN CUTTING, BORING, AND SLOTTING METALS.

SPECIFICATION forming part of Letters Patent No. 605,422, dated June 7, 1898.

Application filed December 28, 1897. Serial No. 664,083. (No model.) Patented in England June 18, 1896, No. 13,429.

*To all whom it may concern:*

Be it known that I, WILLIAM HENRY HARDY, a subject of the Queen of Great Britain and Ireland, residing at Hartlepool, in the county of Durham, England, have invented certain new and useful Improvements in and Relating to Tools and Holders for Use in Cutting, Boring, and Slotting Metals, (for which I have obtained Letters Patent in Great Britain, No. 13,429, dated June 18, 1896;) and I do hereby declare the following to be a full, clear, and exact description of the invention, such as will enable others skilled in the art to which it appertains to make and use the same.

My invention relates to tools of the class used for cutting, boring, and slotting metal—such as iron, brass, or the like—in which a cutting edge is provided at the end of a holder or shaft. This cutting edge is often formed all of a piece with the shaft, so that to change the cutting-tool the holder or shaft must be changed with it, which involves a heavy stock of loose tools where a variety of cutting operations are required; or if the cutting-tool be detachably secured to the holder or shaft this has hitherto been effected by means of a through-hole to receive the cutter, which is secured by a set-screw, and the main defect of this construction is that the edge of the cutter cannot be made to extend beyond or about the end of the tool-shaft in the manner essential for a boring-tool, and tools as hitherto constructed with detachable cutters can only be used for certain purposes.

By my invention I combine the advantages of the tool with its cutter made all in a piece with the tool holder or shaft with the advantages of the tool as hitherto constructed with a detachable cutter—that is to say, that I effect a great saving of tool-steel material by making the same tool holder or shaft adaptable to a number of cutters, and I enable the point or edge of the cutter to be brought up to or as far beyond the end of the tool-shaft as is usually required in ordinary cutting operations.

A machine-tool holder constructed according to my invention is characterized by a simplicity of parts, by which the tool can be removed, replaced, and thoroughly secured without the use of set-screws, wedges, or other similar methods.

In the ordinary application of set-screws for securing the tool in the holder sufficient depth of hole cannot be obtained to provide the necessary number of threads requisite to withstand the strain of frequent slackening and tightening of the set-screw without stripping the thread in an unreasonably short time, causing great annoyance through delay and cost of repairs. In my improved tool-holder not only is this trouble and cost avoided, but, owing to the absence of set-screws, wedges, or other projecting appliances for securing the tool, the cutting edge of the tool can be traversed to the exteme length or depth of the bore and a larger shaft relatively to the size of the hole being bored can be used—as, for instance, a one-inch-diameter tool-shaft for a one-and-one-fourth-inch hole.

Having described the nature of my invention and its utility, I will now proceed to further explain the same by reference to the drawings hereto annexed and the manner by which my said improvements are to be carried into practice.

Figure 2:
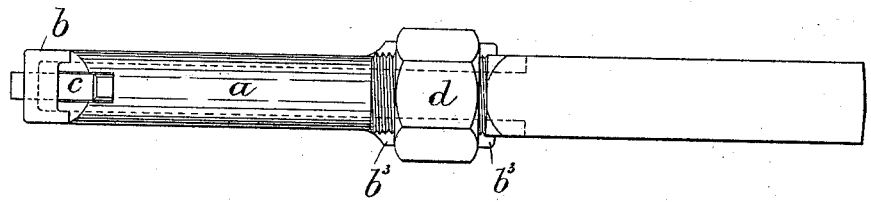
Figure 3:
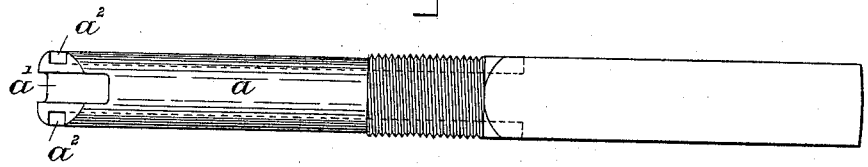
Figure 4:
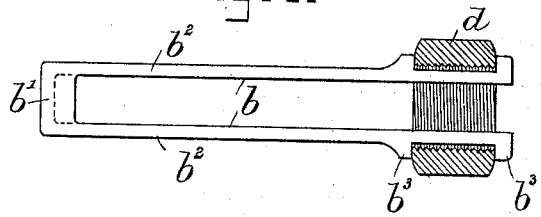
Figure 5:
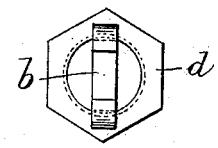

In the drawings, Figure 1 illustrates the tool-holder in elevation complete in all its parts, with the cutting-tool fixed in position and shown transversely. Fig. 2 is a similar view showing the cutting-tool endwise. In Fig. 3 the shaft or tool-holder is shown from the same point of view as in Fig. 1, but stripped of the cutting-tool and all that is detachable in the means for securing it to the tool-holder. Fig. 4 illustrates in part sectional view the said detachable means of securing the tool, Fig. 5 being a plan view of Fig. 4.

In carrying out my invention the tool holder or shaft $a$ is slotted or grooved across the end at $a'$ and along opposite sides of the shaft at $a^2$, so that a clamp $b$, formed by a cross-head $b'$ and two parallel bars $b^2$, can slide along the grooves $a^2$ and close into the cross-head slot $a'$ of the tool holder or shaft $a$ and so clamp in a detachable cutting-tool $c$, which may be diamond-pointed, as shown in Fig 1, or of any other form of cutting edge required in the operations to which my invention is applicable, and I will here observe that the point of the tool can be made to extend beyond the extreme end of the clamp $b$ of the tool-shaft $a$, the practical advantage of which is obvious.

A nut $d$, screwed onto the screw-shaft $a$, engages with the parellel bars $b^2$ of the clamp, the ends $b^3$ of which are turned up or set up for the purpose, and the clamp is applied or relaxed by turning the nut to the right or left, which can readily be done by hand.

Having now described my invention, what I claim as new, and desire to secure by Letters Patent, is—

1. The combination of a tool, a holder therefor provided with grooves in its end and sides, a clamp adapted to slide in the side grooves and means for operating said clamp to adjust the holder, substantially as described.

2. The combination of a tool, a holder therefor provided with a groove in one of its ends and with side grooves, said holder being also provided with screw-threads for a part of its length, a clamp provided with notches and a nut engaging said notches and said screw-threads, substantially as described.

In witness whereof I have hereunto set my hand in presence of two witnesses.

WILLIAM HENRY HARDY.

Witnesses:
GEORGE JAMES CLARKSON,
EDWARD THOMAS ELCOAT.